US008206216B2

(12) United States Patent
Page

(10) Patent No.: US 8,206,216 B2
(45) Date of Patent: Jun. 26, 2012

(54) GAMING MACHINE WITH AUTO-DETECT FEATURE ACTIVATION

(75) Inventor: Mark V. Page, East Chicago, IN (US)

(73) Assignee: WMS Gaming Inc., Waukegan, IL (US)

( * ) Notice: Subject to any disclaimer, the term of this patent is extended or adjusted under 35 U.S.C. 154(b) by 0 days.

(21) Appl. No.: 11/576,072

(22) PCT Filed: Sep. 30, 2005

(86) PCT No.: PCT/US2005/035312

§ 371 (c)(1),
(2), (4) Date: Apr. 22, 2008

(87) PCT Pub. No.: WO2006/039559

PCT Pub. Date: Apr. 13, 2006

(65) Prior Publication Data

US 2009/0017896 A1 Jan. 15, 2009

Related U.S. Application Data

(60) Provisional application No. 60/615,049, filed on Oct. 1, 2004.

(51) Int. Cl.
*A63F 13/00* (2006.01)

(52) U.S. Cl. ................. 463/29; 463/20; 463/36; 463/47

(58) Field of Classification Search .................... 463/30, 463/36, 40, 47, 20, 29
See application file for complete search history.

(56) References Cited

U.S. PATENT DOCUMENTS

| | | | | |
|---|---|---|---|---|
| 5,611,730 | A * | 3/1997 | Weiss | 463/20 |
| 6,102,394 | A | 8/2000 | Wurz et al. | |
| 6,251,014 | B1 * | 6/2001 | Stockdale et al. | 463/16 |
| 6,270,412 | B1 * | 8/2001 | Crawford et al. | 463/20 |
| 6,409,172 | B1 | 6/2002 | Vancura | |
| 7,093,040 | B1 * | 8/2006 | Mach | 710/100 |
| 2002/0198044 | A1 * | 12/2002 | Walker et al. | 463/25 |
| 2003/0054880 | A1 | 3/2003 | Lam et al. | |
| 2003/0064806 | A1 * | 4/2003 | Gordon et al. | 463/42 |
| 2003/0216182 | A1 | 11/2003 | Gauselmann | |

OTHER PUBLICATIONS

"International Search Report for Application No. PCT/US2005/035312, date mailed Oct. 13, 2006", 5 pgs.
"Written Opinion of the International Searching Authority for Application No. PCT/US2005/035312, date mailed Oct. 13, 2006", 8 pgs.

* cited by examiner

*Primary Examiner* — James S McClellan
(74) *Attorney, Agent, or Firm* — Schwegman, Lundberg & Woessner, P.A.

(57) ABSTRACT

Systems and methods for operating a gaming machine that automatically detects peripherals and enables or disables features in accordance with the detected peripherals are disclosed. One aspect of the systems and methods is that the peripheral has an identifier associated with it. The identifier may be used to identify the type of peripheral attached to the gaming machine. After determining the type of peripheral, features associated with the peripheral type may be enabled and other features may be disabled. A further aspect includes reading configuration data for the gaming machine. The configuration data may be compared to the peripheral types that are automatically detected by the gaming machine.

48 Claims, 5 Drawing Sheets

GAMING MACHINE WITH AUTO-DETECT FEATURE ACTIVATION

RELATED APPLICATION(S)

This application is a U.S. National Stage Filing under 35 U.S.C. 371 from International Patent Application Serial No. PCT/US2005/035312, filed 30 Sep. 2005, and published on 13 Apr. 2006 as WO 2006/039559 A2, and republished on 13 Apr. 2006 as WO 2006/039559 A3, which claims the priority benefit of U.S. Provisional Application Ser. No. 60/615,049, filed 1 Oct. 2004, the contents of which are incorporated herein by reference.

FIELD

The present invention relates generally to gaming machines, and more particularly to a gaming machine that automatically detects feature activation.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

BACKGROUND

Today's gaming machine typically comprises a computerized system controlling a video display or reels that provide wagering games such as slots, video card games (poker, blackjack etc.), video keno, video bingo, video pachinko and other games typical in the gaming industry. Generally, the popularity of such machines with players is dependent on the likelihood (or perceived likelihood) of winning money at the machine and the intrinsic entertainment value of the machine relative to other available gaming options. Players also appreciate the reliability of a gaming machine, as do the casino operators. Shrewd operators consequently strive to employ the most entertaining, exciting, and reliable machines available because such machines attract frequent play and hence increase profitability to the operator.

When a gaming machine is not operating due to configuration, reconfiguration or troubleshooting, it is not contributing revenue for the owner of the gaming machine. Unfortunately, the software used in previous systems to configure and diagnose problems on a gaming machine may often be responsible for substantial periods of downtime. One issue is that there may be a mismatch between the types of peripherals attached to a gaming machine and the configuration data for the gaming machine. For example, the gaming machine may have a button panel having nine buttons while the configuration data may indicate that a sixteen button panel is present. Such mismatches can lead to the incorrect operation of the gaming machine, or the gaming machine may not operate at all. In either case, the gaming machine operator can suffer a loss of revenue associated with the downtime due to the inoperable gaming machine and further expense in having a technician correct the problem.

A second issue is that it can be difficult to correctly configure a gaming machine. Often numerous switches, jumpers or other hardware must be set correctly so that software reading the switch or jumper settings can operate properly on the machine. It is easy to incorrectly set a jumper or switch, resulting in an incorrectly configured gaming machine.

In view of the above, there is a need in the art for the present invention.

SUMMARY

The above-mentioned shortcomings, disadvantages and problems are addressed by the present invention, which will be understood by reading and studying the following specification.

Systems and methods for operating a gaming machine that automatically detects peripherals and enables or disables features in accordance with the detected peripherals are disclosed. One aspect of the systems and methods is that the peripheral has an identifier associated with it. The identifier may be used to identify the type of peripheral attached to the gaming machine. After determining the type of peripheral, features associated with the peripheral type may be enabled and other features may be disabled. A further aspect includes reading configuration data for the gaming machine. The configuration data may be compared to the peripheral types that are automatically detected by the gaming machine.

The present invention describes systems, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION

Figure 1:
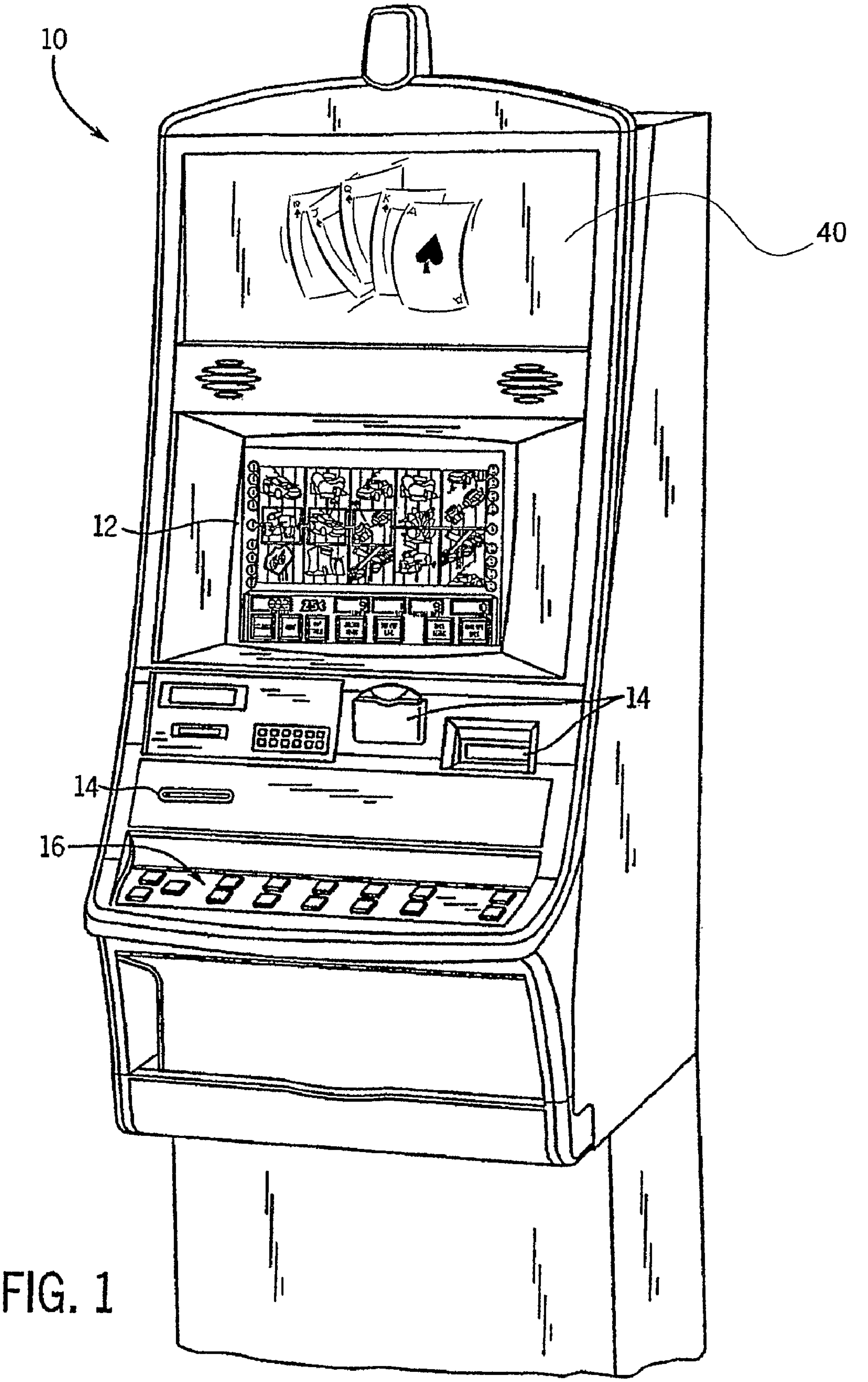
FIG. 1 is a perspective view of an exemplary gaming machine incorporating embodiments of the present invention.

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the present invention.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component which appears in multiple Figures. Signals and connections may be referred to by the same reference number or label, and the actual meaning will be clear from its use in the context of the description.

The description of the various embodiments is to be construed as exemplary only and does not describe every possible instance of the invention. Numerous alternatives could be implemented, using combinations of current or future technologies, which would still fall within the scope of the claims. The following detailed description is, therefore, not to be taken in a limiting sense, and the scope of the present invention is defined only by the appended claims.

Operating Environment

FIG. 1 illustrates an exemplary gaming machine 10 in which embodiments of the invention may be implemented. In some embodiments, gaming machine 10 is operable to conduct a wagering game such as mechanical or video slots, poker, keno, bingo, or blackjack. If based in video, the gaming machine 10 includes a video display 12 such as a cathode ray tube (CRT), liquid crystal display (LCD), plasma, or other type of video display known in the art. A touch screen preferably overlies the display 12. In the illustrated embodiment, the gaming machine 10 is an "upright" version in which the display 12 is, oriented vertically relative to a player. Alternatively, the gaming machine may be a "slant-top" version in which the display 12 is slanted at about a thirty-degree angle toward the player.

The gaming machine 10 includes a plurality of possible credit receiving mechanisms 14 for receiving credits to be used for placing wagers in the game. The credit receiving mechanisms 14 may, for example, include a coin acceptor, a bill acceptor, a ticket reader, and a card reader. The bill acceptor and the ticket reader may be combined into a single unit. The card reader may, for example, accept magnetic cards and smart (chip) cards coded with money or designating an account containing money.

In some embodiments, the gaming machine 10 includes a user interface comprising a plurality of push-buttons 16, the above-noted touch screen, and other possible devices. The plurality of push-buttons 16 may, for example, include one or more "bet" buttons for wagering, a "play" button for commencing play, a "collect" button for cashing out, a "help" button for viewing a help screen, a "pay table" button for viewing the pay table(s), and a "call attendant" button for calling an attendant. Additional game specific buttons may be provided to facilitate play of the specific game executed on the machine. The touch screen may define touch keys for implementing many of the same functions as the push-buttons. Other possible user interface devices include a keyboard and an pointing device such as a mouse or trackball.

In some embodiments, gaming machine 10 includes a top box 40. Top box 40 may contain a video display, a mechanical display, or a diorama display that supplements display 12. For example, the display in top box 40 may be a wheel such as a rotating wheel, mechanical dice, a board for a board game, or other such display.

A processor controls operation of the gaming machine 10. In response to receiving a wager and a command to initiate play, the processor randomly selects a game outcome from a plurality of possible outcomes and causes the display 12 to depict indicia representative of the selected game outcome. In the case of slots for example mechanical or simulated slot reels are rotated and stopped to place symbols on the reels in visual association with one or more pay lines. If the selected outcome is one of the winning outcomes defined by a pay table, the processor awards the player with a number of credits associated with the winning outcome.

Figure 2:
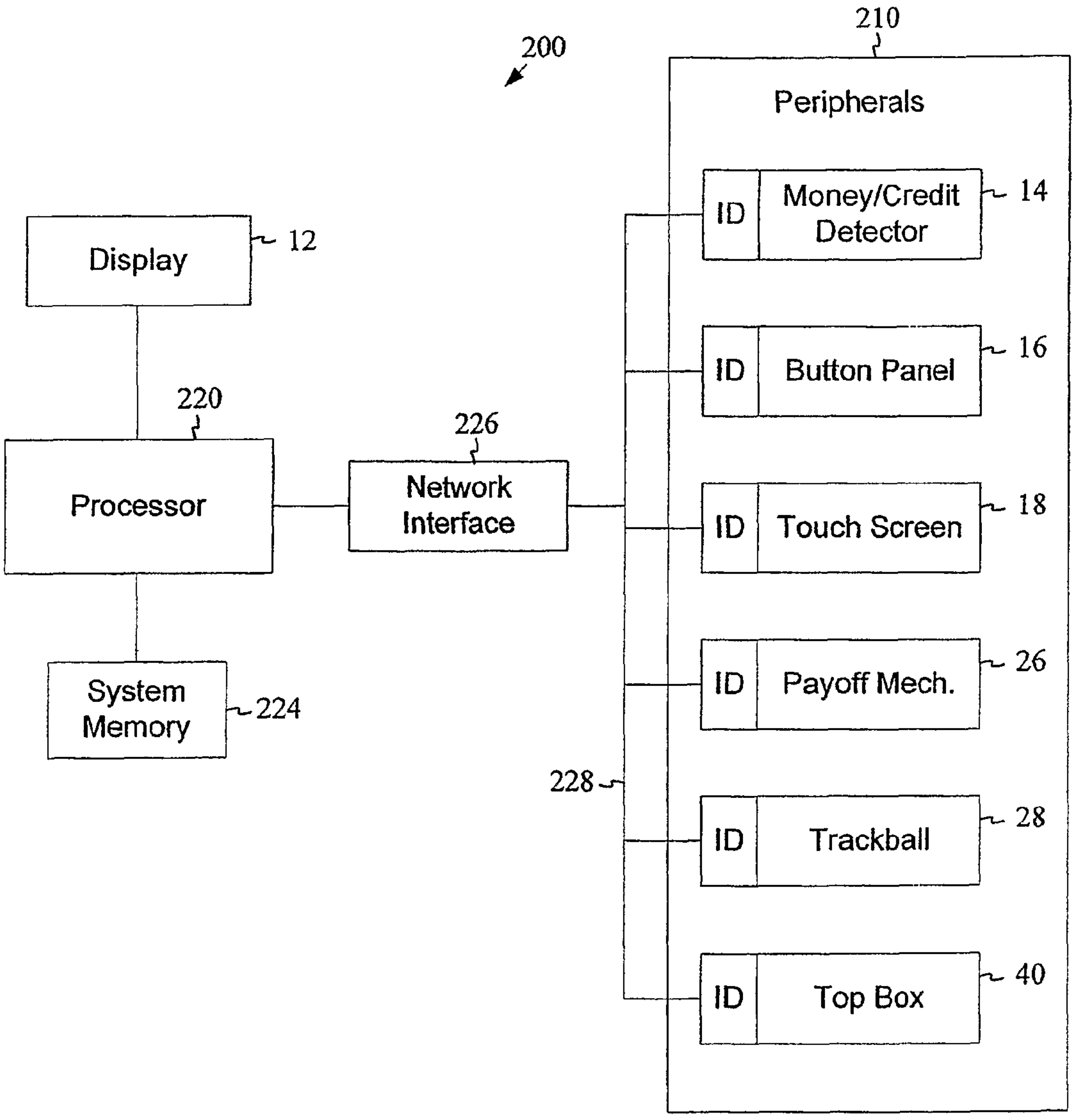
FIG. 2 is a block diagram of a gaming control system suitable for operating the gaming machine in FIG. 1.

FIG. 2 is a block diagram of a control system 200 suitable for operating the gaming machine 10. In some embodiments, system 200 includes a processor 220 having a system memory 224 and coupled to at least one display 12. In addition system 200 includes a network interface 226 coupling a variety of peripherals 210 to the system through network 228. In some embodiments of the invention, network 228 is an IEEE RS485 based network. In alternative embodiments, network 228 may be a USB (Universal Serial Bus) based network. In further alternative embodiments, network 228 may be an Ethernet based network. In still further alternative embodiments, network 228 may be a Firewire based network. The embodiments of the invention are not limited to any particular type of network 228.

System memory 224 stores control software, operational instructions and data associated with the gaming machine, including feature data and software. In one embodiment, the system memory 224 comprises a separate read-only memory (ROM) and battery-backed random-access memory (RAM). However, it will be appreciated that the system memory 224 may be implemented on any of several alternative types of memory structures or may be implemented on a single memory structure.

Peripherals 210 may include any type of peripheral capable of being coupled to the system via network 228. In some embodiments, peripherals 210 include one or more of money detector 14, button panel 16, touch screen 18, payoff mechanism 26, trackball 28 and top box 40.

Money/credit detector 14 signals a processor 220 when a player has inserted money, tickets, tokens, cards or other mechanism for obtaining credits for plays on the gaming machine through credit mechanisms 14. Using a button panel 16 and/or a touch screen 18, the player may select any variables associated with the wagering game and place his/her wager to purchase a play of the game. In a play of the game, the processor 220 generates at least one random event using a random number generator (RNG) and provides an award to the player for a winning outcome of the random event. Alternatively, the random event may be generated by a remote computer using an RNG or pooling schema and then transmitted to the gaming machine. The processor 220 operates the display 12 to represent the random event(s) and outcome(s) in a visual form that can be understood by the player. In addition to the processor 220, the control system may include one or more additional slave control units for operating the display 12 and any secondary displays.

A payoff mechanism 26 is operable in response to instructions from the processor 220 to award a payoff to the player. The payoff may, for example, be in the form of a number of credits. The number of credits is determined by one or more math tables stored in the system memory 224.

Trackball 28 may be used to provide input for software including gaming applications running on the gaming machine.

A top box mechanism 40 may include a motorized or video display that is activated at predetermined points of a game executed by the gaming machine.

It should be noted that peripherals 210 may also include what is known in the art as a "dongle" peripheral. A dongle peripheral's function is to enable or disable features based on the physical presence of the dongle, the dongle typically serves no other function.

In some embodiments of the invention, the peripherals described above each have an identifier associated with the peripheral. The identifier may be used to identify the type of peripheral attached to the peripheral network 228.

Figure 3:
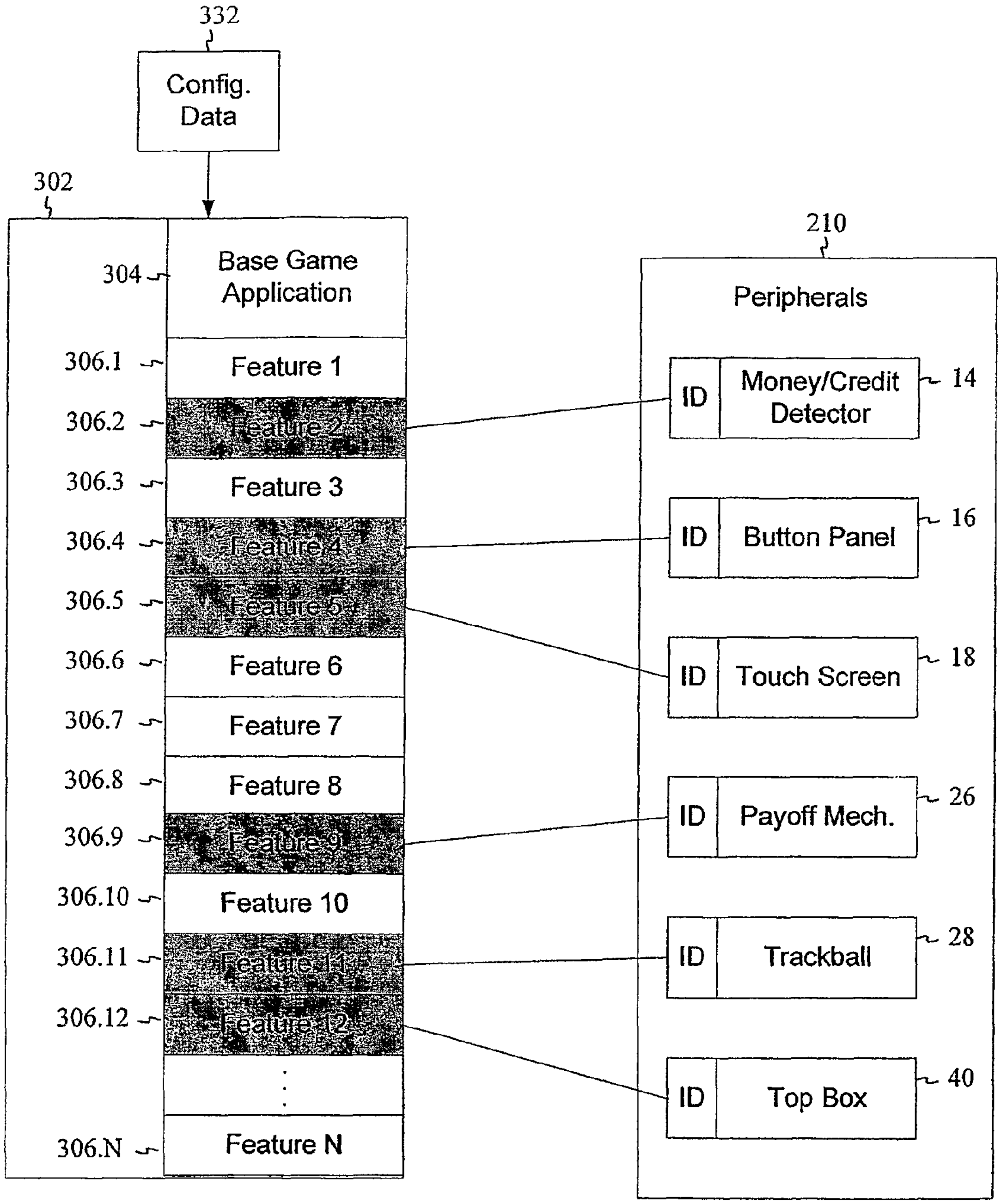
FIG. 3 is a block diagram illustrating the activation of features based on the automatic detection of peripherals coupled to the gaming machine according to embodiments of the invention.

FIG. 3 is a block diagram illustrating the activation of features based on the automatic detection of peripherals coupled to the gaming machine according to embodiments of the invention. In some embodiments of the invention, a game application 302 operated on control system 200 includes a base game application 304 and one or more features 306. The features 306 may be activated and deactivated based on the presence of peripherals 210.

For the purposes of this specification, a feature 306 may include a feature, service or function that may be enabled (e.g. activated) or disabled (e.g. deactivated). Examples of such features will be described below.

In the exemplary embodiment illustrated in FIG. 3, various features 306 activated due to the detection of particular peripherals 210 are shaded (i.e. features 2, 4-5, 9 and 11-12), while features that are not activated are not shaded.

Features that are not activated may be present on the machine (e.g. resident in the memory or configuration of the gaming machine), however the feature is hidden from the user. For example, feature 306.2 is activated due to the detected presence of money/credit detector 14. Feature 306.4 is activated due to the detected presence of button panel 16. Feature 5 is activated due to the detected presence of touch screen 18 etc. It should be noted that the detection of a peripheral may result in the activation or deactivation of more than one feature.

Further details on the operation of the automatic feature detection will be provided below with reference to FIGS. 4 and 5.

Figure 4:
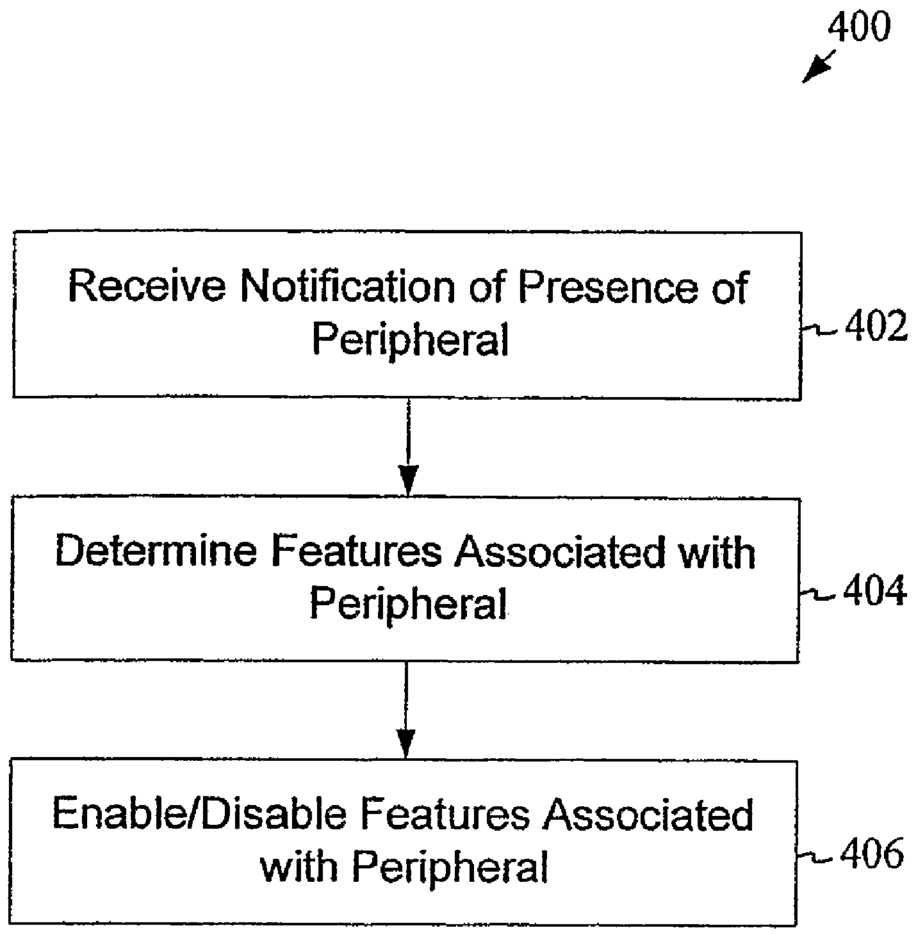
FIG. 4 is a flowchart illustrating methods for providing automatic feature detection on a gaming machine according to embodiments of the invention.

FIG. 4 is a flowchart illustrating a method 400 for providing automatic feature detection on a gaming machine according to embodiments of the invention. The method to be performed by the operating environment constitutes computer programs made up of computer-executable instructions. Describing the method by reference to a flowchart enables one skilled in the art to develop such programs including such instructions to carry out the method on suitable processors for gaming machines (the processor or processors of the computer executing the instructions from computer-readable media). The method illustrated in FIG. 4 is inclusive of acts that may be taken by an operating environment executing an exemplary embodiment of the invention.

The method begins by receiving notification of the presence of a peripheral (block 402). The notification may be received at various times during the operation of the gaming machine. In some embodiments, the notification is received as the gaming machine is initializing itself as the result of powering on or being reset. In alternative embodiments, the notification may be received as a result of a peripheral being attached to a peripheral network while the gaming machine is running. The notification may be received over the peripheral network, and typically includes an identifier for the peripheral.

Next, the gaming control system determines the feature or features that are associated with the peripheral (block 404). The association may be based on the peripheral identifier.

Next, the system proceeds to enable (or disable if appropriate) the features associated with the peripheral (block 406). As noted above, enabling or disabling a feature may result in the activation or deactivation of a function, service or feature.

Examples of the execution of method 400 will now be provided. It should be noted that the examples discussed are exemplary, and no embodiment of the invention is limited to a particular feature set or peripheral set interaction.

In some embodiments, when a money detector peripheral is capable of receiving coins or tokens of differing denominations, a coin/token hopper may be disabled. This is desirable because the gaming machine will be unable to determine the exact amount in the hopper due to the possibility of varying denominations of coins or tokens. Further, the presence of a multi-denomination money detector may result in the enabling of a ticket payoff mechanism.

In addition, the type of money detector peripheral may enable differing pay tables based on the denomination of the money detector.

In some embodiments, a display peripheral may be coupled to gaming machine 10, for example in a top box or secondary display. The system may use the peripheral identifier to determine the display capabilities (resolution, simultaneous colors, refresh rate etc.) in order to determine the graphics that a game application will display on the display peripheral.

Similarly, in some embodiments, a sound peripheral may be coupled to gaming machine 10. The sound peripheral's identifier may be used to determine which sounds or sound files the sound peripheral is capable of playing.

In some embodiments, various types of button peripherals having differing numbers of buttons and button layouts may be coupled to the gaming machine. The type of button peripheral may be determined based on the button peripheral identifier. The type of button peripheral may in turn enable different pay tables depending on the button peripheral type, and may also enable different bonus rounds based on the button peripheral type. For example, some embodiments of the invention include a button panel having a "Can't Lose" button. When a Can't Lose symbol lands on a payline, the player gets a free spin that is guaranteed to be a winner. The spin doesn't have to be used immediately and is started by pushing the "Can't Lose" button. The "Can't Lose" button, when present, may control the number of winning lines displayed on a slot machine, and may also activate a pay table that is appropriate for games incorporating the "Can't Lose" button.

Further, the game play may be altered from a basic game version to a version having different characteristics from the basic version based on the presence of particular button peripheral types.

In some embodiments, the presence of a trackball peripheral will enable graphical user interface features that include menus or icons that may be selected using the trackball.

Those of skill in the art will appreciate that the above description is exemplary in nature, and that other combinations of peripherals and features are within the scope of the inventive subject matter.

Figure 5:
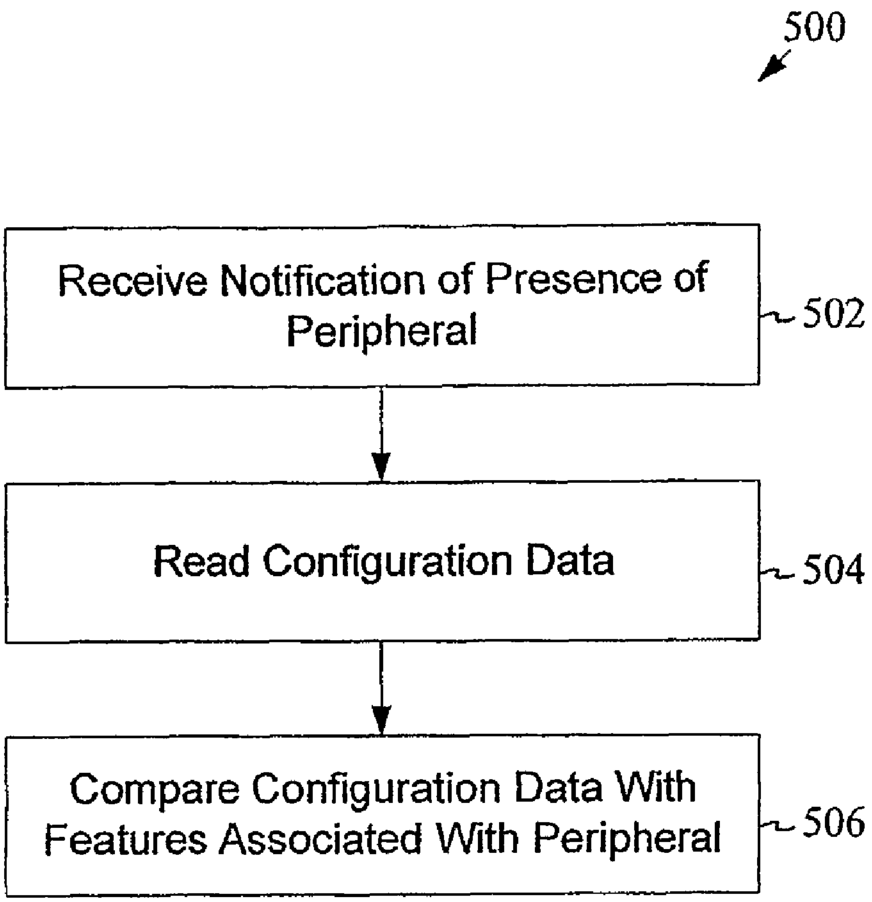
FIG. 5 is a flowchart illustrating methods for comparing a configuration with automatically detected peripherals on a gaming machine according to embodiments of the invention.

FIG. 5 is a flowchart illustrating a method 500 for comparing a configuration with automatically detected peripherals on a gaming machine according to embodiments of the invention. The method begins by receiving notification of the presence of a peripheral (block 502). As discussed above with respect to block 402, the notification may be received at various times during the operation of the gaming machine. In some embodiments, the notification is received as the gaming machine is initializing itself as the result of powering on or being reset. In alternative embodiments, the notification may be received as a result of a peripheral being attached to a peripheral network while the gaming machine is running. The notification may be received over the peripheral network, and typically includes an identifier for the peripheral.

The system also reads configuration data (block 504). The configuration data may include data related to the peripherals, and/or may include information regarding the configuration of a game or games available on the gaming machine.

Next, the system compares the configuration data with the peripheral data and features to determine if there is a mismatch (block 506). A mismatch may result from inconsistent combinations of peripherals, inconsistent features between the game configuration and the features enabled by the peripheral, or other types of inconsistencies. In response to the inconsistency, the system may reconfigure itself, or the system may generate an alarm or alert intended to notify a technician of the inconsistency.

An example of the type of configuration inconsistency involves a bill validator or money detector. The bill validator or money detector may accept bills or money in one denomination, while the game itself is configured for a different denomination. For example, a bill validator may accept French francs, but the game may be configured to display and play using American dollars. Such an inconsistency is but one example of the types of inconsistencies that may be detected using the systems and methods described above. Those of skill in the art will appreciate that other configuration problems may be detected by the systems and methods above and are within the scope of the inventive subject matter.

CONCLUSION

Systems and methods for providing a gaming machine with auto-detect feature activation have been disclosed. The systems and methods described provide advantages over previous systems. The time necessary to configure a gaming machine may be reduced by the embodiments of the invention, and further, the correctness of the configuration may be further assured. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

The terminology used in this application is meant to include all of these environments. It is to be understood that the above description is intended to be illustrative, and not restrictive. Many other embodiments will be apparent to those of skill in the art upon reviewing the above description. Therefore, it is manifestly intended that this invention be limited only by the following claims and equivalents thereof.

What is claimed is:

1. A gaming machine comprising:

a processor and a memory;

the memory storing instructions of a game application that when executed by the processor compute a wagering game outcome of a wagering game and present the wagering game outcome in response to a wager of monetary value, the game application providing one or more features capable of being switched between enabled and disabled states, the features altering game play of the wagering game when in the enabled state; and the memory further storing instructions of a feature control application that when executed by the processor controls features in one or more applications including the game application executing on the gaming machine, the feature control application configured to perform operations comprising:

detecting the presence of an input peripheral device and an identifier of the input peripheral device; and automatically enabling at least one feature of the features of the game application to alter the game play of the wagering game in response to the detection of the input peripheral device and the identifier, the at least one feature selected from the group consisting of a number of paylines to be presented by the wagering game and a pay table to be used in determining the wagering game outcome.

2. The gaming machine of claim 1, further comprising a network communicably coupling the peripheral device to the processor.

3. The gaming machine of claim 2, wherein the network comprises an RS485 based network.

4. The gaming machine of claim 2, wherein the network comprises a USB network.

5. The gaming machine of claim 2, wherein the network comprises a firewire network.

6. The gaming machine of claim 1, wherein the peripheral device comprises a button panel.

7. A method for operating a gaming machine, the method comprising:

executing instructions with a processor to determine the presence of an input peripheral device coupled to the gaming machine, the input peripheral device having an identifier;

based on the identifier of the input peripheral device, enabling a feature of a wagering game application, the feature capable of being switched between enabled and disabled states, and the feature altering game play provided by the wagering game application when in the enabled state, the wagering game application interacting with the input peripheral device coupled to the gaming machine using an interface provided by control software operating on the gaming machine; and automatically enabling or disabling the feature within the wagering game application based on the determined presence of the input peripheral device, the feature selected from the group consisting of a number of paylines to be presented by the wagering game and a pay table to be used in determining the wagering game outcome.

8. The method of claim 7, wherein the peripheral device comprises a button panel.

9. The method of claim 7, wherein enabling or disabling the feature includes enabling a pay table of a plurality of pay tables in accordance with the peripheral device.

10. A computer-readable storage medium having stored thereon computer executable instructions for causing one or more processors to perform a method for operating a gaming machine, the method comprising:

determining the presence of an input peripheral device coupled to the gaming machine, the input peripheral device having an identifier;

based on the identifier of the input peripheral device, enabling a feature of a wagering game application, the feature capable of being switched between enabled and disabled states, and the feature altering game play provided by the wagering game application when in the enabled state, the wagering game application interacting with the input peripheral device coupled to the gaming machine using an interface provided by control software operating on the gaming machine; and automatically enabling or disabling the feature based on the presence of the input peripheral device, the feature selected from the group consisting of a number of paylines to be presented by the wagering game and a pay table to be used in determining the wagering game outcome.

11. The computer-readable storage medium of claim 10, wherein the peripheral device comprises a button panel.

12. A method for operating a gaming machine, the method comprising:

executing instructions with a processor to determine the presence of a peripheral device coupled to the gaming machine, the peripheral device configured to receive user input; and based on an identifier of the peripheral device, automatically enabling or disabling a feature of a game application to alter game play of a wagering game to be presented on the gaming machine, the wagering game application interacting with the peripheral device coupled to the gaming machine using an interface provided by control software operating on the gaming machine, the feature configured to utilize the user input received by the peripheral device when in the enabled state.

13. The method of claim 12, wherein the peripheral device comprises a button panel.

14. The method of claim 12, wherein the feature comprises a pay table.

15. The method of claim 12, wherein the feature comprises a bonus round.

16. The method of claim 15, wherein the peripheral device comprises a secondary display, wherein the bonus round is presented on the secondary display.

17. The method of claim 12, wherein enabling or disabling the feature includes enabling a pay table of a plurality of pay tables in accordance with the peripheral device.

18. A gaming machine comprising:

a processor and a memory;

the memory storing instructions of a game application that when executed by the processor compute a game outcome of a wagering game and present the game outcome in response to a wager of monetary value, the game application providing one or more features capable of being switched between enabled and disabled states, the features altering game play of the wagering game and affecting a payout of the wagering game when in the enabled state; and the memory further storing instructions of a feature control application that when executed by the processor provide one or more applications including the game application executing on the gaming machine with an interface to detect and interact with one or more coupled peripheral devices, and the feature control application configured to perform operations comprising:

detecting the presence of a peripheral device, the peripheral device configured to receive user input, and based on an identifier of the peripheral device, automatically enabling at least one of the features affecting the payout of the wagering game, the at least one feature configured to utilize the user input received by the peripheral device when in the enabled state.

19. The gaming machine of claim 18, wherein the peripheral device comprises a button panel.

20. The gaming machine of claim 18, wherein the feature comprises a bonus round.

21. The gaming machine of claim 20, wherein the peripheral device comprises a secondary display, wherein the bonus round is presented on the secondary display.

22. A gaming machine comprising:

a processor and a memory;

the memory storing instructions of a game application that when executed by the processor computes a game outcome of a wagering game and presents the game outcome in response to a wager of monetary value, the game application comprising a plurality of features capable of being switched between enabled and disabled states, the features altering game play of the wagering game when in the enabled state; and the memory further storing instructions of a feature control application that when executed by the processor provide one or more applications executing on the gaming machine, the one or more applications having an interface to detect and interact with one or more coupled peripheral devices, and the feature control application configured to perform operations comprising:

detecting the presence of a peripheral device and an identifier of the detected peripheral device, the peripheral device configured to receive user input;

determining, based on the identifier of the peripheral device, if the game application is configured for operation with the detected peripheral device; and responsive to determining the game application is not configured for operation with the detected peripheral device, automatically configuring the game application for operation with the detected peripheral device by enabling or disabling at least one feature of the features, the features configured to utilize the user input received by the peripheral device when in the enabled state.

23. The gaming machine of claim 22, wherein the at least one feature enabled or disabled is selected from the group consisting of a number of paylines to be presented by the wagering game and a pay table used to compute the game outcome.

24. The gaming machine of claim 22, wherein the at least one feature enabled or disabled affects a payout of the game application.

25. The gaming machine of claim 22, wherein determining if the game application is configured for operation with the detected peripheral device includes determining the game application is not configured for operation with the detected peripheral device based on one of:

a mismatch between a number of buttons on a button panel peripheral device and a number of buttons for which the game application is configured;

a button present on a button panel peripheral device for a special feature for which the game application is not configured; and a mismatch between a denomination of currency a peripheral device is capable of accepting and a denomination for which the game application is configured.

26. The gaming machine of claim 22, wherein determining if the game application is configured for operation with the detected peripheral device includes determining the game application is not configured for operation with the detected peripheral device if the game application is configured to present a wagering game which is not of a type that is appropriate for use with the detected peripheral device.

27. The gaming machine of claim 22, wherein determining if the game application is configured for operation with the detected peripheral device includes determining the game application is not configured for operation with the detected peripheral device if a feature of the game application that is associated with the detected peripheral device is disabled.

28. The gaming machine of claim 22, wherein determining if the game application is configured for operation with the detected peripheral device includes determining the game application is not configured for operation with the detected peripheral device if the game application is configured to present a wagering game which is not a particular wagering game associated with the peripheral device.

29. The gaming machine of claim 22, wherein the at least one feature enabled or disabled comprises a bonus round.

30. The gaming machine of claim 22, wherein the peripheral device comprises a secondary display, and wherein the at least one feature enabled or disabled comprises a bonus round.

31. A method for operating a gaming machine, the method comprising:

executing instructions with a processor to detect the presence of a peripheral device coupled to the gaming machine, the peripheral device having an identifier, and the peripheral device configured to receive user input;

providing a game application on the gaming machine, the game application computing a game outcome of a wagering game and presenting the game outcome in response to a wager of monetary value, the game application including a plurality of features capable of being switched between enabled and disabled states, the features altering game play provided by the game application when in the enabled state, and the game application interacting with peripheral devices coupled to the gaming machine using an interface provided by control software operating on the gaming machine;

based on the identifier of the peripheral device, determining if a game application operating on the gaming machine is not configured for operation with the detected peripheral device; and responsive to determining the game application is not configured for operation with the detected peripheral device, automatically configuring the game application for operation with the detected peripheral device by enabling or disabling at least one feature of the features, the feature configured to utilize the user input received by the peripheral device when in the enabled state.

32. The method of claim 31, wherein the at least one feature enabled or disabled is selected from the group consisting of a number of paylines to be presented by the wagering game and a pay table used to compute the game outcome.

33. The method of claim 31, wherein the at least one feature enabled or disabled affects a payout of the game application.

34. The method of claim 31, wherein determining if the game application is configured for operation with the detected peripheral device includes determining the game application is not configured for operation with the detected peripheral device based on one of:

a mismatch between a number of buttons on a button panel peripheral device and a number of buttons for which the game application is configured;

a button present on a button panel peripheral device for a special feature for which the game application is not configured; and;

a mismatch between a denomination of currency a peripheral device is capable of accepting and a denomination for which the game application is configured.

35. The method of claim 31, wherein determining if the game application is configured for operation with the detected peripheral device includes determining the game application is not configured for operation with the detected peripheral device if the game application is configured to present a wagering game which is not of a type that is appropriate for use with the detected peripheral device.

36. The method of claim 31, wherein determining if the game application is configured for operation with the detected peripheral device includes determining the game application is not configured for operation with the detected peripheral device if a feature of the game application that is associated with the detected peripheral device is disabled.

37. The method of claim 31, wherein determining if the game application is configured for operation with the detected peripheral device includes determining the game application is not configured for operation with the detected peripheral device if the game application is configured to present a wagering game which is not a particular wagering game associated with the peripheral device.

38. The method of claim 31, wherein the at least one feature enabled or disabled comprises a bonus round.

39. The method of claim 31, wherein the peripheral device comprises a secondary display, and wherein the at least one feature enabled or disabled comprises a bonus round.

40. A computer-readable storage medium having stored thereon computer executable instructions for causing one or more processors to perform a method for operating a gaming machine, the method comprising:

detecting the presence of a peripheral device coupled to the gaming machine, the peripheral device having an identifier, and the peripheral device configured to receive user input;

based on the identifier of the peripheral device, determining if a game application operating on the gaming machine is not configured for operation with the detected peripheral device, the game application computing a game outcome of a wagering game and presenting the game outcome in response to a wager of monetary value, the game application providing a plurality of features capable of being switched between enabled and disabled states, the features altering game play provided by the game application when in the enabled state, and the game application interacting with peripheral devices coupled to the gaming machine using an interface provided by control software operating on the gaming machine; and responsive to determining the game application is not configured for operation with the detected peripheral device, configuring the game application for operation with the detected peripheral device by enabling or disabling at least one feature of the features, the feature configured to utilize the user input received by the peripheral device when in the enabled state.

41. The computer-readable storage medium of claim 40, wherein the at least one feature enabled or disabled is selected from the group consisting of a number of paylines to be presented by the wagering game and a pay table used to compute the game outcome.

42. The computer-readable storage medium of claim 40, wherein the at least one feature enabled or disabled affects a payout of the game application.

43. The computer-readable storage medium of claim 40, wherein determining if the game application is configured for operation with the detected peripheral device includes determining the game application is not configured for operation with the detected peripheral device based on one of:

a mismatch between a number of buttons on a button panel peripheral device and a number of buttons for which the game application is configured;

a button present on a button panel peripheral device for a special feature for which the game application is not configured; and a mismatch between a denomination of currency a peripheral device is capable of accepting and a denomination for which the game application is configured.

44. The computer-readable storage medium of claim 40, wherein determining if the game application is configured for operation with the detected peripheral device includes determining the game application is not configured for operation with the detected peripheral device if the game application is configured to present a wagering game which is not of a type that is appropriate for use with the detected peripheral device.

45. The computer-readable storage medium of claim 40, wherein determining if the game application is configured for operation with the detected peripheral device includes determining the game application is not configured for operation with the detected peripheral device if a feature of the game application that is associated with the detected peripheral device is disabled.

46. The computer-readable storage medium of claim 40, wherein determining if the game application is configured for operation with the detected peripheral device includes determining the game application is not configured for operation with the detected peripheral device if the game application is configured to present a wagering game which is not a particular wagering game associated with the peripheral device.

47. The computer-readable storage medium of claim 40, wherein the at least one feature enabled or disabled comprises a bonus round.

48. The computer-readable storage medium of claim 40, wherein the peripheral device comprises a secondary display, and wherein the at least one feature enabled or disabled comprises a bonus round.

* * * * *

UNITED STATES PATENT AND TRADEMARK OFFICE

CERTIFICATE OF CORRECTION

PATENT NO. : 8,206,216 B2
APPLICATION NO. : 11/576072
DATED : June 26, 2012
INVENTOR(S) : Mark V. Page It is certified that error appears in the above-identified patent and that said Letters Patent is hereby corrected as shown below:

In column 1, line 33, delete “gaining”, and insert --gaming--, therefor

In column 4, line 7, delete “an”, and insert --a--, therefor

In column 12, line 8, in Claim 34, After “and”, delete “;”, therefor

Signed and Sealed this
Second Day of October, 2012

David J. Kappos
*Director of the United States Patent and Trademark Office*